Patented Sept. 17, 1935

2,014,740

UNITED STATES PATENT OFFICE 2,014,740

HYDRATION OF OLEFINES

Alfred T. Larson, Wilmington, Del., assignor to E. I. du Pont de Nemours & Company, Wilmington, Del., a corporation of Delaware No Drawing. Application October 4, 1932, Serial No. 636,189

13 Claims. (Cl. 260—156)

This invention relates to the synthesis of organic compounds and more particularly to the preparation of monohydroxy aliphatic alcohols by the interaction of olefines and steam.

Aliphatic alcohols have been prepared from olefines and steam,—the reaction being conducted both in the liquid and vapor phase. The liquid phase reaction involves the absorption of olefines such as ethylene in strong sulfuric acid with the production from this specific olefine of ethyl ether and ethyl alcohol. In the vapor phase processes analogous products are obtained by passing the olefines and steam over a catalyst support such as pumice, kieselguhr, etc., impregnated with a catalyst such as a concentrated solution of sulfuric acid. The present invention involves improvements in the preparation of monohydroxy aliphatic alcohols by similar processes wherein many of the difficulties heretofore encountered are overcome.

An object of the present invention is to provide an improvement in processes for the preparation of monohydroxy aliphatic alcohols from olefinic hydrocarbons and steam. A further object of the invention is to provide a process for the preparation of compounds containing a hydroxyl group directly linked to an alkyl group by the interaction of an olefine and steam in the presence of a catalyst. A further object of the present invention is to conduct such reactions in the presence of a catalyst comprising a volatile halide and activated carbon. Other objects and advantages of the invention will hereinafter appear.

I have found that monohydroxy aliphatic alcohols can be prepared by a vapor phase reaction between steam and an olefinic hydrocarbon in the presence of a volatile halide or compounds which decompose to form a volatile halide under the conditions existing during the reaction. In order to effect the reaction I contact the reactants with a volatile halide or a compound which decomposes to form a volatile halide under suitable pressure and temperature conditions. Usually I prefer to pass the reactants together with the halide over an absorbent material such as pumice, silica gel, coke, and the like, but more particularly over a form of active carbon such as activated charcoal. The activated charcoal or other absorbent material may or may not act as a support for activating constituents such, for example, as the metal halides and more particularly the alkali metal and alkaline earth metal halides and the amphoteric metal halides, although the presence of these activators is not essential when the reaction is conducted in the presence of my preferred absorbent material, i. e. a form of active carbon.

The halides which I prefer to employ include the hydrogen halides, e. g. hydrogen chloride, hydrogen iodide, and hydrogen bromide. As indicated above, it is not essential that the halides be added as a hydrogen halide to the reaction for compounds which decompose to give such halides or which form the halides under the conditions of the reaction are likewise suitable. Examples of such compounds are the volatile organic halides, as methyl and ethyl chloride, iodide, bromide, etc., carbon tetrachloride, as well as the ammonium halides, e. g. ammonium chloride, ammonium iodide, the chloramines, etc.

The olefinic hydrocarbons suitable for use in my process are readily available from a number of sources; thus, ethylene, propylene, butylene, and various homologues thereof are found in gases evolved in cracking petroleum and may be separated therefrom, for example, by fractional liquefaction, or by copper liquor scrubbing. It is preferable, for the sake of avoiding undesirable side reactions, that the hydrocarbon which it is desired to convert be employed in a relatively high degree of purity.

The relative proportions of the reactants, i. e. the olefinic hydrocarbon and steam, can be varied, although usually a substantial excess of the steam over the olefine is desirable. In other words, more than 9 parts by weight of steam to 14 parts by weight of ethylene, for example, should be employed for the preparation of ethanol.

The use of pressures in excess of atmospheric, say from 25 to 900 atmospheres, is preferred although atmospheric pressures may be employed with a resulting lowering in quantity of out-put, of course, from a given equipment. The reaction proceeds over a comparatively wide range of temperatures although the optimum temperature varies with specific cases depending inter alia upon the olefinic hydrocarbon being used. Generally, the desired reaction can be obtained at from 125–300° C. From the standpoint of practical operation the temperature should not be so low that the reaction rate is uneconomical, nor so high as to result in undesirable side reactions and/or polymerization of the raw materials. From this point of view the process should preferably be operated within the range of 175–225° C.

The following examples will illustrate methods of practising the invention, although the invention is not limited to the examples:

*Example 1.*—A gaseous mixture containing, by weight 5 parts of steam to 7 parts of ethylene, the steam being provided by the injection of the appropriate amount of a 1% aqueous solution of ammonium chloride, is passed into a conversion chamber containing activated charcoal. The chamber should be designed for the carrying out of exothermic gaseous reactions and the temperature maintained therein at approximately 175° C. while the pressure is held at approximately 25 atmospheres.

*Example 2.*—In lieu of injecting ammonium chloride to the reaction a 1% solution of ammonium iodide may be injected to give a steam to gas ratio of .75 by weight and employing a temperature of 200° C. and a pressure of 700 atmospheres. Any residual ethylene not converted to ethyl alcohol may be recirculated over the catalyst.

*Example 3.*—By conducting the reaction in the manner similar to that given in Example 1 but substituting propylene for the ethylene therein used and a 0.5% hydrochloric acid solution in lieu of the 1% ammonium chloride solution injected into that reaction, a propyl alcohol will be obtained.

The apparatus which may be employed for conducting these reactions may be of any conventional type and preferably one in which the temperature of exothermic reactions can be readily controlled at the desired value. Owing to the corrosive action of the catalyst used, the interior of the converter and conduit leading therefrom should preferably be protected. This may be accomplished by using glass or glass-lined apparatus or by coating the inner surfaces of the apparatus with copper, tantalum, or silver, or using for the construction of the equipment acid-resisting alloys of, for example, copper, molybdenum, cobalt, tungsten, manganese, or nickel.

Various changes may be made in the method hereinbefore described without departing from the invention or sacrificing any of the advantages that may be derived therefrom.

I claim:

1. The process which comprises reacting an olefinic hydrocarbon and steam in the vapor phase and thereby producing a compound containing a hydroxyl group directly linked to an alkyl group characterized in that the olefinic hydrocarbon and steam react in the presence of a volatile halide and an absorbent material.

2. The process which comprises reacting an olefine and steam in the vapor phase and thereby producing a compound containing a hydroxyl group directly linked to an alkyl group characterized in that the olefine and steam react in the presence of a volatile halide and active carbon as the catalyst.

3. The process which comprises reacting ethylene and steam in the vapor phase and thereby producing a compound containing a hydroxyl group directly linked to an alkyl group characterized in that the ethylene and steam react in the presence of a volatile halide and active carbon as the catalyst.

4. The process which comprises reacting ethylene and steam in the vapor phase and thereby producing ethanol characterized in that the ethylene and steam react in the presence of a hydrogen halide and active carbon as the catalyst.

5. The process which comprises reacting propylene and steam in the vapor phase and thereby producing a propyl alcohol characterized in that the propylene and steam react in the presence of a hydrogen halide and active carbon as the catalyst.

6. The process which comprises reacting butylene and steam in the vapor phase and thereby producing a butyl alcohol characterized in that the butylene and steam react in the presence of a hydrogen halide and active carbon as the catalyst.

7. The process which comprises reacting an olefinic hydrocarbon and steam in the vapor phase and thereby obtaining a saturated monohydroxy aliphatic alcohol characterized in that the olefinic hydrocarbon and steam are passed over a volatile halide and active carbon as the catalyst for the reaction.

8. In a process for the preparation of compounds containing a hydroxyl group directly linked to an alkyl group by the interaction of an olefinic hydrocarbon and steam in the vapor phase, the steps which comprise passing over activated carbon the olefinic hydrocarbon, the steam, and the volatile halide catalyst under a temperature within the range of 125° to 300° C. and under a pressure within the range of 25–900 atmospheres.

9. In a process of reacting an olefinic hydrocarbon and steam in the vapor phase and thereby producing a compound containing a hydroxyl group directly linked to an alkyl group the step which comprises continuously passing into the reaction zone the olefinic hydrocarbon, steam, and a volatile halide catalyst all in the vapor phase.

10. In a process of reacting ethylene and steam in the vapor phase and thereby producing ethanol the step which comprises continuously passing into the reaction zone the ethylene, steam, and a volatile halide catalyst all in the vapor phase.

11. In a process of reacting propylene and steam in the vapor phase and thereby producing a propyl alcohol, the step which comprises continuously passing into the reaction zone the propylene, steam, and a volatile halide catalyst all in the vapor phase.

12. In a process of reacting butylene and steam in the vapor phase and thereby producing a butyl alcohol the step which comprises continuously passing into the reaction zone butylene, steam, and a volatile halide catalyst all in the vapor phase.

13. The process which comprises reacting an olefinic hydrocarbon and steam in the vapor phase and thereby producing a compound containing a hydroxyl group directly linked to an alkyl group characterized in that the olefinic hydrocarbon, steam, and a volatile halide catalyst all in the vapor phase are continuously passed into the reaction zone.

ALFRED T. LARSON.